US 6,751,312 B1

(12) United States Patent
Kudoh

(10) Patent No.: US 6,751,312 B1
(45) Date of Patent: Jun. 15, 2004

(54) KNOB FOR COVERING A TOP END OF A POINTING STICK OF A STICK SWITCH, STICK SWITCH, AND PORTABLE ELECTRONIC DEVICE AND PORTABLE TELEPHONE COMPRISING THE STICK SWITCH

(75) Inventor: Kazuhiro Kudoh, Tokyo (JP)

(73) Assignee: NEC Corporation (JP)

( * ) Notice: Subject to any disclaimer, the term of this patent is extended or adjusted under 35 U.S.C. 154(b) by 461 days.

(21) Appl. No.: 09/632,130

(22) Filed: Aug. 3, 2000

(30) Foreign Application Priority Data

Aug. 3, 1999 (JP) .......................................... 11/219698

(51) Int. Cl.$^7$ ............................................... H04M 1/00
(52) U.S. Cl. ................................... 379/368; 379/433.17
(58) Field of Search ..................... 379/433.07, 433.06, 379/368; 200/5 A; 455/90.3

(56) References Cited

U.S. PATENT DOCUMENTS 5,498,843 A * 3/1996 Date et al. .................. 200/5 A
6,153,843 A * 11/2000 Date et al. .................. 200/5 A

FOREIGN PATENT DOCUMENTS

JP          10-243081          9/1998
JP          11-126126          5/1999

OTHER PUBLICATIONS

Japanese Office Action dated Apr. 23, 2003 (w/English translation of relevant portions).

* cited by examiner

*Primary Examiner*—Jack Chiang
(74) *Attorney, Agent, or Firm*—Dickstein, Shapiro, Morin & Oshinsky, LLP.

(57) ABSTRACT

A know which covers a top end of a pointing stick used in a stick switch of a portable electronic device, such as a portable telephone has a top concave surface projected from a skirt and opposite to a cavity to be attached to a pointing stick. On the top surface of the knob, grooves are formed in directions to be tilted along orthogonal lines. The concave top surface can make the projection contact to the fingertip of the finger closely.

21 Claims, 5 Drawing Sheets

KNOB FOR COVERING A TOP END OF A POINTING STICK OF A STICK SWITCH, STICK SWITCH, AND PORTABLE ELECTRONIC DEVICE AND PORTABLE TELEPHONE COMPRISING THE STICK SWITCH

BACKGROUND OF THE INVENTION

This invention relates to a stick switch comprising a pointing stick. The pointing stick is tilted and pushed by a fingertip for inputting. The stick switch is available for a pointing device of a portable electronic device like a portable telephone and a PDA (personal digital assistant).

Recently, most of portable electronic devices each comprises a pointing device for moving a cursor in their displaying devices. For example, a portable telephone nowadays has not only a basic communication function but also several functions, and the pointing device is used for selecting one of these functions from a function menu. Typical functions besides the communication function may be, for example, a telephone directory function for selecting a recipient name instead of inputting its recipient telephone number, a timer function for displaying current date and time, an alarm function for sounding an alarm when a predetermined condition occurs, and a calling sound selection function. The pointing device is also used in these typical functions.

A stick switch is applicable for a pointing device of a portable electronic device. As an example of such a portable electronic device, description will be made about a portable telephone 102 comprising a stick switch for its pointing device. As shown in FIG. 1, the portable telephone 102 is covered with a case 104. On a front surface of the case 104, push buttons 106, a display 108, a microphone hole 110, and a speaker hole 112 are installed. The push buttons 106 are used as number keys and other function keys. The display 108 displays a screen and a cursor that is movable by a maneuver of a user on the display. A microphone is installed under the microphone hole 110. A speaker is installed under the speaker hole 112. Further, an opening 114 is formed between the top row of the push buttons 106 and the display 108. As shown in FIG. 2, a stick switch 116 is installed on an inner board 118 under the opening 114. A slope 118 is formed in order to help a user to easily operate the stick switch 116.

As shown in FIGS. 2 and 3, the stick switch 116 comprises a switch box 122 and a stick 124. The top end of the stick 124 is covered with a know 126 whose top part is exposed from the opening 114. The knob 126 has a cavity (not shown) for inserting the top end of the stick 124, a skirt 128 formed around the cavity and a projection 130 formed opposite to the cavity and centered on the skirt 128.

The stick 124, as shown in FIG. 3, can be tilted in four directions A, B, C, and D by the user. Further, the stick 124 can be pushed downward in a direction E. In the switch box 122, there is one common terminal 132 and five optional terminals 134, 136, 138, 140 and 142, as shown in FIG. 4. Each of the optional terminals corresponds to one of the directions A, B, C, D and E. When the stick 124 is operated, the common terminal 132 is connected with either one of the corresponding optional terminals.

Usually, a user can operate the portable telephone 102 by tilting/pushing the stick 124. The user puts his/her fingertip on the top of the projection 130 and tilts/pushes the stick 134. For example, the cursor displayed on the display 108 moves right/left when the user tilts the stick 124 to the direction C/D. The cursor moves upward/downward when the user tilts the stick 124 to the direction A/B. To push the stick 124 to the direction E means to select an item, such as an icon and a telephone number, corresponding to current position of the cursor displayed on the display 108.

The illustrated portable electronic device comprising the stick switch 116 has problems below.

First, it is difficult for the portable electronic device comprising the stick switch 116 to possess both portability and operability at the same time. Specifically, if a length L0 from the top of the projection 130 to the opening 114 is long, then a user puts and keeps his/her fingertip on the top of the projection 130 easily, and as a result, the portable electronic device has high operability. On the other hand, when the user puts the portable electronic device into a bag, a pocket or the like, the top of the projection 130 is possibly caught in it and consequently the user has to be careful in taking out the portable electronic device. Furthermore, the portable electronic device might be wrongly operated when the top of the projection 130 is accidentally tilted/pushed. However, merely shortening the length L0 is harmful to operability of the portable electronic device.

Second, it is difficult for the portable electronic device to have both thinness of the portable electronic device and operability of the stick switch 116 at the same time. Here, the length between both ends of the stick 124 is referred to as length L1. As shown in FIG. 2, when the length L1 is short, a force F for tilting the stick 124 is strong. On the contrary, when the length L1 becomes longer, the force F becomes weak but the length L1 makes the case 104 thicker.

SUMMARY OF THE INVENTION

It is an object of the present invention to provide a stick switch that has excellent operability and portability.

It is another object of the present invention to provide a knob that is for use in the stick switch. It is yet another object of the present invention to provide an electronic portable device that has the stick switch excellent in operability.

It is still another object of the present invention to provide a portable telephone that has a good portability.

According to the present invention, a knob for covering a top of a pointing stick which is projected from a switch box of a stick switch and which is inclined in different directions in order to carry out switch operations in accordance with each of the directions is provided. The knob has a concave top surface fitted with a fingertip and has at least one groove corresponding to one of the directions.

In this knob, the concave top surface is engaged with the fingertip so that the knob can efficiently transmit the force of the fingertip to the pointing stick even if the pointing stick is short. Consequently, the knob can make the stick switch thin without spoiling operability.

In the above-mentioned knob, the concave top surface may be substantially spherical in shape on a plane view.

The knob may be formed by either one of an elastic material and a rigid material.

When the stick switch is inclined in four directions which are azimuthally spaced apart from one another by 90 degrees, the knob may have at least one groove formed on the top surface along hypothetical crossing lines indicating the four directions. In this case, the grooves are formed on the top surface along the four directions, respectively. The top surface may have an edge of a circular shape, each groove formed on the top surface along a hypothetical diameter line of the edge. The top surface may have an edge of a circular shape; each groove formed on the edge.

According to the present invention, a stick switch comprising a pointing stick which is projected from a switch box of the stick switch and which is inclined in different directions in order to carry out switch operations in accordance with each of the directions is provided. The pointing stick of the stick switch has a concave top surface fitted with a fingertip and has at least one groove corresponding to one of the directions.

In this stick switch, the concave top surface may be substantially spherical in shape on a plane view.

When the pointing stick may be inclined in four directions which are azimuthally spaced apart from one another by 90 degrees, the pointing stick may have at least one groove formed on the top surface along hypothetical crossing lines indicating the four directions. In this case, the grooves may be formed on the top surface along the four directions, respectively. The top surface may have an edge of a circular shape, each groove formed on the top surface along a hypothetical diameter line of the edge. The top surface may have an edge of a circular shape; each groove formed on the edge.

According to the present invention, a portable electronic device comprising at least one stick switch comprising a pointing stick which is projected from a switch box of the stick switch and which is inclined in different directions in order to carry out switch operations in accordance with each of the directions is provided. The pointing stick of the portable electronic device has a concave top surface fitted with a fingertip and has at least one groove corresponding to one of the directions.

In this portable electronic device, the concave top surface may be substantially spherical in shape on a plane view.

When the pointing stick is inclined in four directions which are azimuthally spaced apart from one another by 90 degrees, the pointing stick may have at least one groove formed on the top surface along hypothetical crossing lines indicating the four directions.

In the above-mentioned portable electronic device, the grooves may be formed on the top surface along the four directions, respectively.

In the above-mentioned portable electronic device, the top surface has an edge of a circular shape; each groove formed on the top surface along a hypothetical diameter line of the edge.

In the above-mentioned portable electronic device, the top surface has an edge of a circular shape; each groove formed on the edge.

According to the present invention, a portable telephone comprising at least one stick switch comprising a pointing stick which is projected from a switch box of the stick switch and which is inclined in different directions in order to carry out switch operations in accordance with each of the directions is provided. The pointing stick of the portable telephone has a concave top surface fitted with a fingertip and has at least one groove corresponding to one of the directions.

In this portable telephone, the concave top surface may be substantially spherical in shape on a plane view.

When the pointing stick is inclined in four directions which are azimuthally spaced apart one another by 90 degrees, the pointing stick may have at least one groove formed on the top surface along hypothetical crossing lines indicating the four directions.

In the above-mentioned portable telephone, the grooves may be formed on the top surface along the four directions, respectively.

In the above-mentioned portable telephone, the top surface may have an edge of a circular shape; each groove formed on the top surface along a hypothetical diameter line of the edge.

In the above-mentioned portable telephone, the top surface may have an edge of a circular shape; each groove formed on the edge.

DESCRIPTION OF THE PREFERRED EMBODIMENTS

Description will be made about a first embodiment according to the present invention below. In the following description, the same elements as those described above will be given the same reference numbers. Description about the same portions mentioned before will be omitted.

Figure 1:
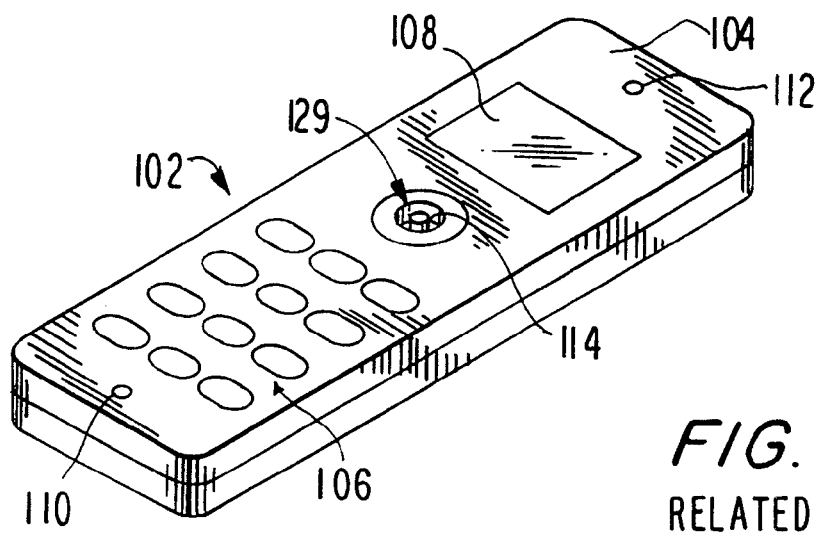
FIG. 1 is a perspective diagram of a portable telephone related to the present invention.
Figure 2:
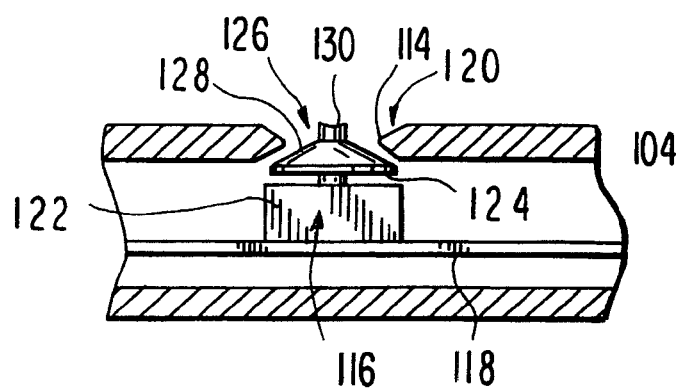
FIG. 2 is a fragmentary sectional view of the portable telephone shown in FIG. 1.
Figure 5:
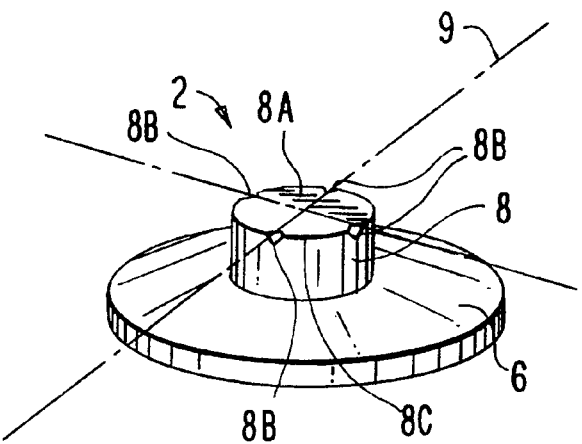
FIG. 5 is a perspective diagram of a knob embodying the invention.
Figure 6:
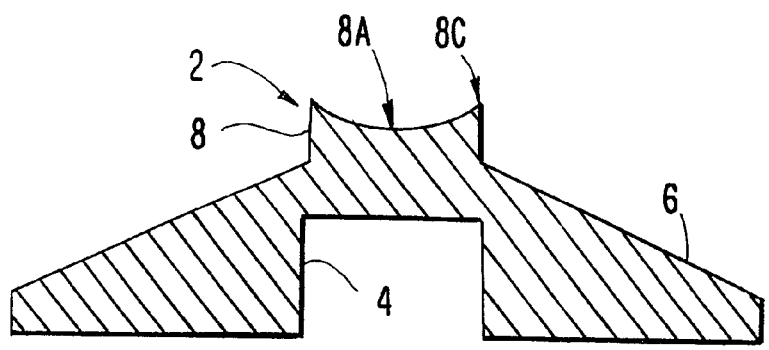
FIG. 6 is a sectional side elevation of the knob shown in FIG. 5.

Referring to FIG. 5 and 6, a knob 2 has a cavity 4, a skirt 6 and a projection 8, as best shown in FIG. 6. The cavity 4 is put on the top of the stick 124 (FIG. 2). The skirt 6 surrounds the cavity 4. The projection 8 is formed opposite to the cavity 4, at the center of the skirt 6 and, as a result, is projected from the skirt 6 on an opposite side of the cavity 4.

The projection 8 has a concave top surface 8A and four grooves 8B on the top surface 8A at points of intersection between an edge 8C of the projection 8 and orthogonal lines 9, as shown in FIG. 5. The orthogonal lines 9 are hypothetically drawn on the top surface on the top surface 8A and intersect or cross with each other at the center of the top surface 8A. Each of the grooves 8B is extended from the top surface 8A through a cylinder of the projection 8.

Figure 7:
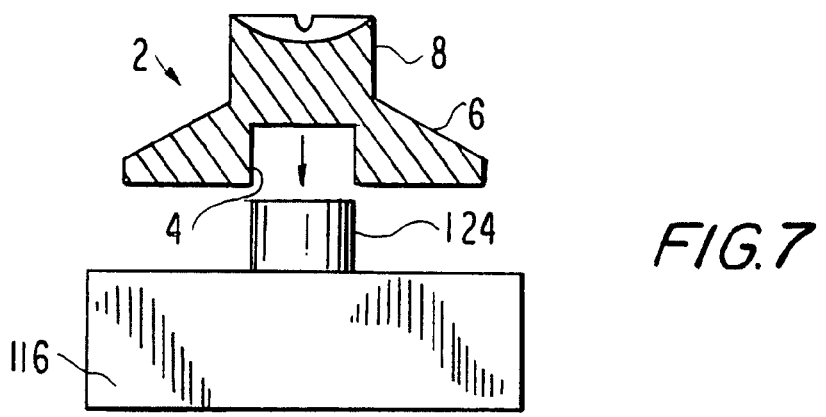
FIG. 7 is a partially sectional view of the knob shown in FIG. 5 and a stick switch to show how to fix the knob to the stick switch.
Figure 8:
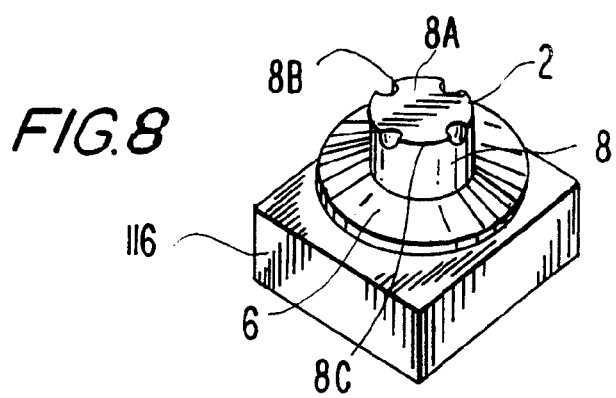
FIG. 8 is a perspective view of the stick switch comprising the knob shown in FIG. 7.

As shown in FIG. 7, the top of the stick 124 is pushed into the cavity 4. As a result, the knob 2 is fixed as shown in FIG.

Figure 3:
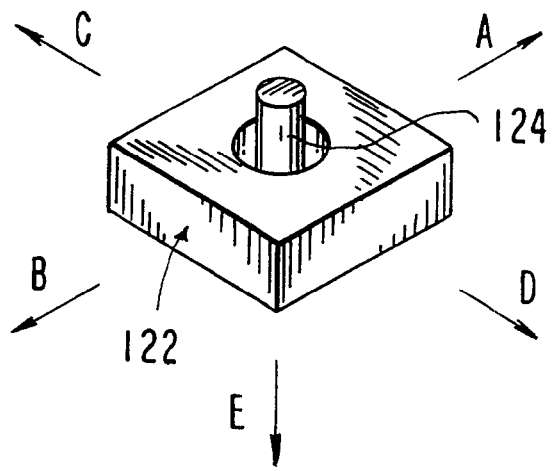
FIG. 3 is a perspective diagram of a stick switch related to the invention.
Figure 4:
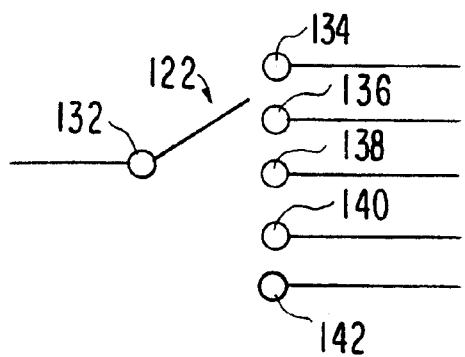
FIG. 4 is a circuit diagram of a stick switch related to the invention.

8. One of the orthogonal lines 9 is made to correspond with the direction A and B in FIG. 3 and the other is made to correspond with the direction C and D.

Figure 9:
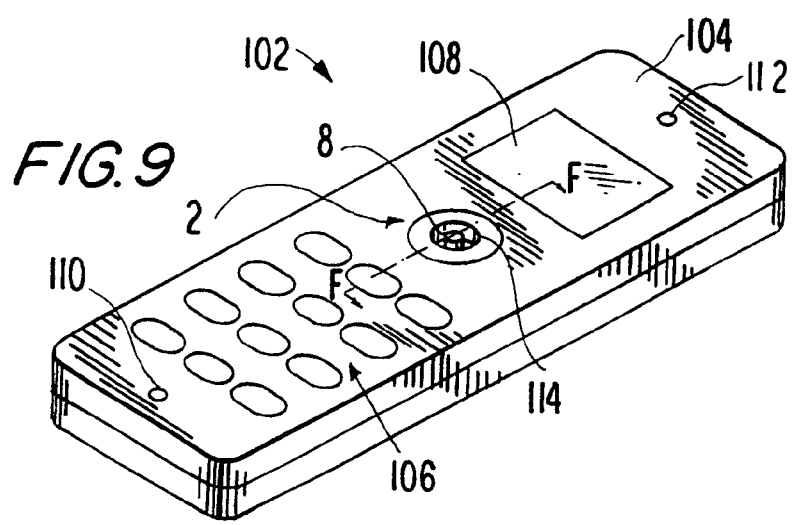
FIG. 9 is a perspective view of a portable telephone comprising the stick switch shown in FIG. 8.
Figure 10:
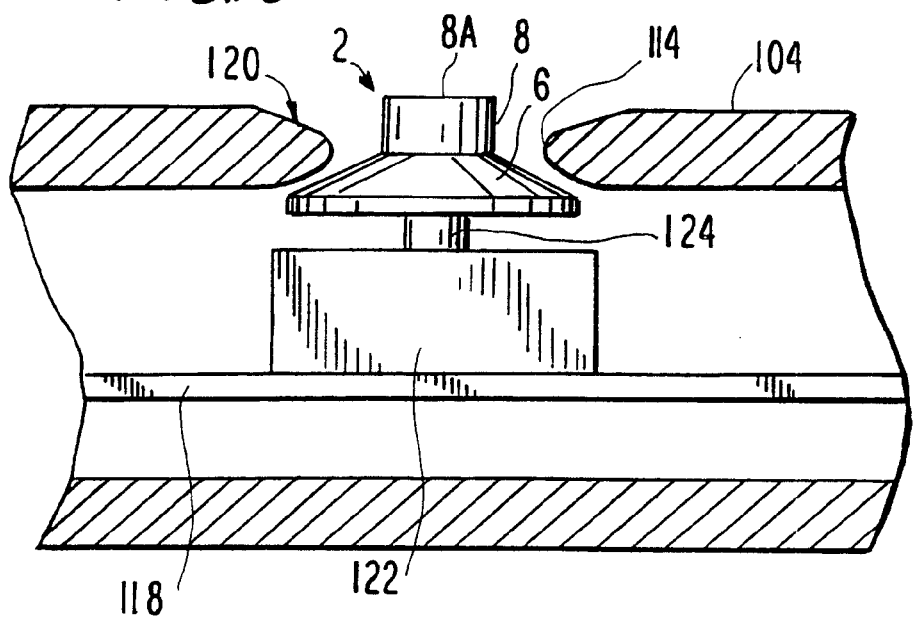
FIG. 10 is a partially sectional view taken along the lines F—F of FIG. 9.

As shown in FIGS. 9 and 10, the stick switch 116 comprising the knob 2 is installed in the portable telephone 102 in the same way as the stick switch comprising the knob 126. The stick switch 116 is placed under the opening 114 on the inner board 118 in order that the knob 2 faces upward. The height or the top surface 8A is substantially equal to the height of the case 104 around the opening 114.

Figure 11:
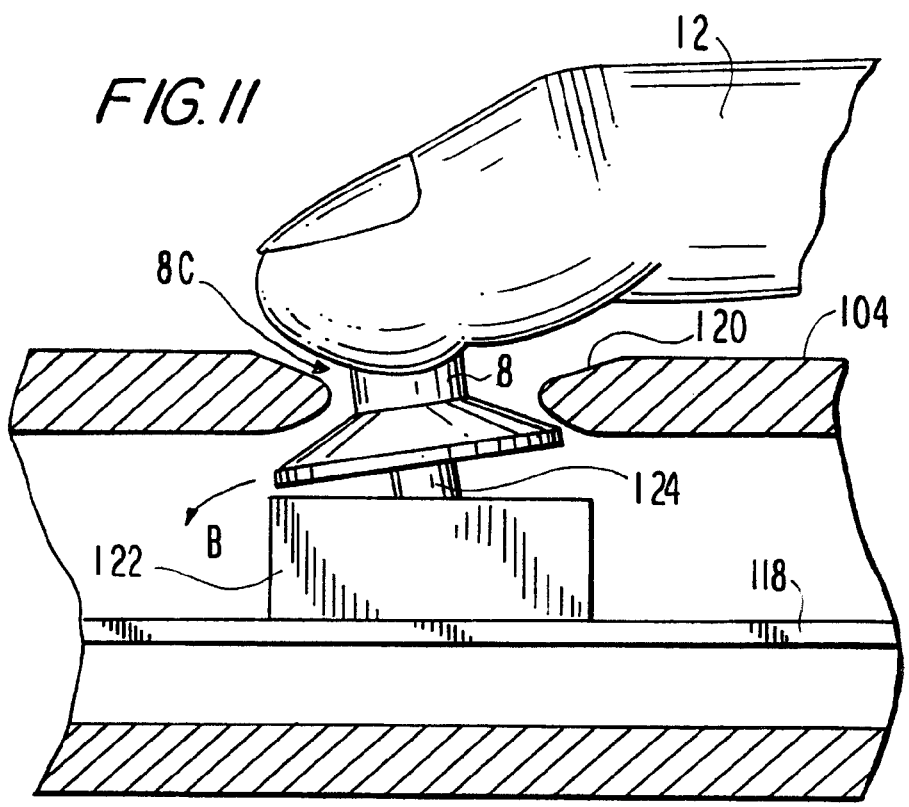
FIG. 11 is a partially sectional view taken along the line F—F of FIG. 9 to show how to operate the stick switch by a finger.

The stick switch 116 comprising the knob 2 is operated as shown in FIG. 11. In FIG. 11, a fingertip of a finger 12 presses on the top surface 8A and gives force to the direction B so as to tilt the stick 124 to the direction B.

When the finger 12 tilts the stick 124, the edge 8C guides the fingertip to easily catch the knob 2, the top concave surface 8A closely fitted with a fingertip of the finger 12, and each of the grooves 8B engages the fingertip of the finger 12. As a result, the knob 2 can improve operability of the stick switch 116.

According to tight contact between the finger 12 and the top surface 8A, the stick switch 116 has high operability even if the length-between the base end of the stick 124 and the knob 2 is shorter. Consequently, the height of the stick switch 116 can become lower and a portable electronic device with the stick switch 116 can become thinner.

Furthermore, each of the grooves 8B corresponds to one of the directions A, B, C and D that the stick 124 can be tilted to and, in consequence, the fingertip of the finger 12 can distinguish between the directions from the sense of touch on the grooves 8B. Consequently, the knob 2 can improve operability of the stick switch 116 in this respect too.

Both elastic and rigid materials are available for the knob 2. When the knob 2 is made of elastic material like rubber, the knob 2 hardly slips from the finger 12. When the knob 2 is made of rigid material like plastic, the edge 8C engages the finger 12 more firmly.

Next, description will be made about second embodiment of the present invention. The difference between the first and the second embodiments is a shape of the knob covering the top surface 8A.

Figure 12A:
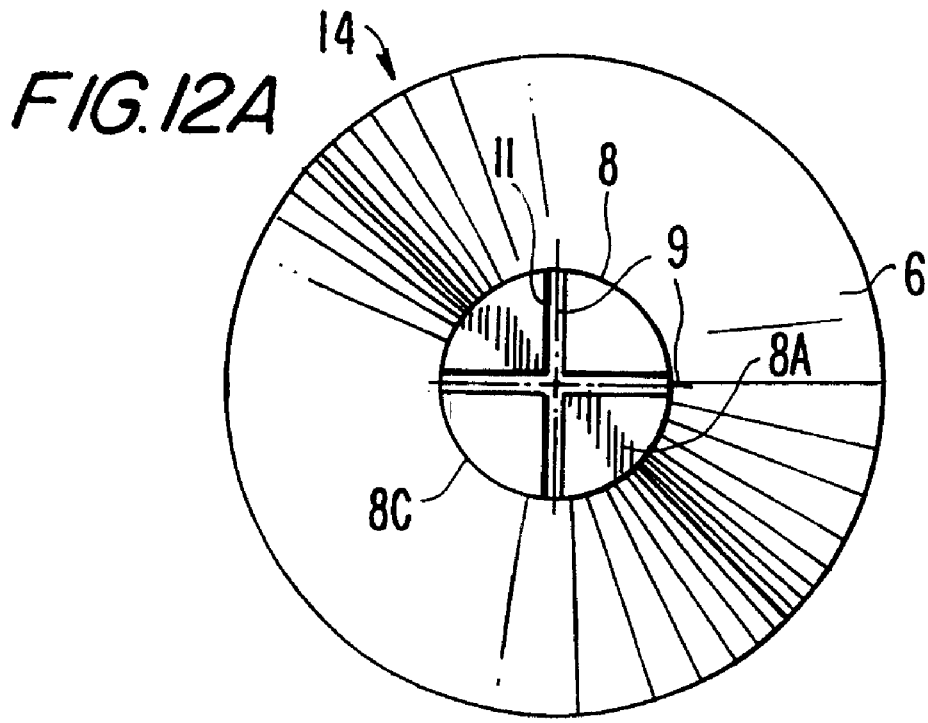
FIG. 12A is a plan view of the knob embodying the invention and FIG. 12B is a sectional side elevation of the knob shown in FIG. 12A.
Figure 12B:
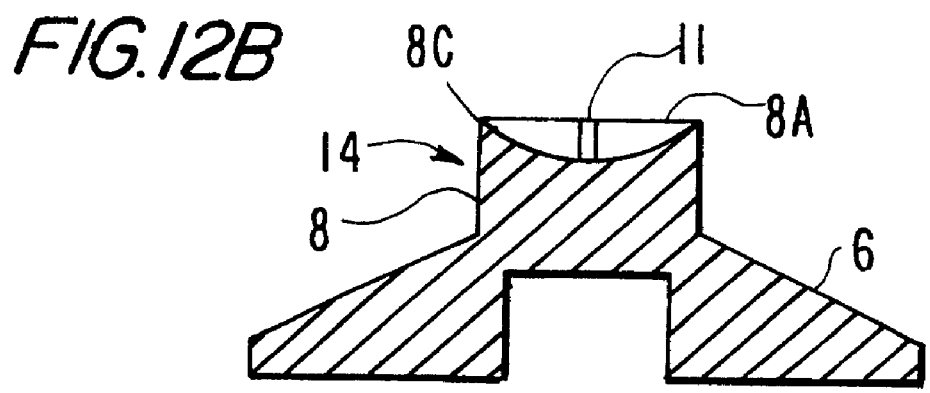

As shown in FIGS. 12(A) and 12(B), the knob 2 according to the first embodiment has the grooves 8B each of which is formed along a part of each orthogonal line 9 or the edge of the projection 8. On the other hand, a knob 14 according to the second embodiment has grooves 11 each of which is continuously extended along the orthogonal line 9 across the top surface 8A as shown in FIGS. 12A and 12B. The knob 14 is installed on the stick 124 in order that each of the grooves 11 corresponds to the direction to which the stick 124 is tilted.

The groove 11 is longer than the groove 8B so that the fingertip of the finger 12 can recognize the grooves 11 more easily than the groove 8B. Consequently the knob 14 can tilt the direction for tilting the stick 124 to the finger 12 for certain.

While this invention has thus far been described in conjunction with a few embodiments thereof, it will be readily possible for those skilled in the art to put the this invention into various other manners. For example, the knob may be applicable to any other electronic devices than the portable telephone. And also, the knob may have above four grooves.

What is claimed is:

1. The combination of a pointing stick which projects from a switch box of a stick switch and which is tiltable in different directions in order to carry out switch operations as a function thereof and a knob covering a top of the pointing stick, the knob having a top surface which includes a concave portion for receiving the fingertip of a user, the concave portion having an outer perimeter and a plurality of grooves formed in the outer perimeter at locations corresponding to respective ones of the directions so that the knob, and with it the pointing stick, may be tilted in the different directions without removing the user's finger tip from the concave portion.

2. The knob claimed in claim 1, wherein the concave portion is substantially spherical in shape on a plane view.

3. The knob claimed in claim 1, which is formed by either one of an elastic material and a rigid material.

4. The knob claimed in claim 1, the stick switch being tiltable in four directions which are azimuthally spaced part from one another by 90 degrees, plurality of grooves including at least two grooves extending on to the concave portion along hypothetical crossing lines indicating the four directions.

5. The knob claimed in claim 4, wherein the two grooves are formed on the concave portion along the four directions.

6. The knob claimed in claim 4, wherein the outer perimeter of the concave is circular in shape.

7. A stick switch comprising a switch box, a pointing stick which, projects from the switch box and which is tiltable in different directions in order to carry out switch operations as a function thereof, the pointing stick having a top surface including a concave portion for receiving the fingertip of a user, the concave portion having an outer perimeter and a plurality of grooves formed in the outer perimeter at locations corresponding to respective ones of the directions so that the pointing stick may be tilted in the different directions without removing the user's finger tip from the concave portion.

8. The stick switch claimed in claim 7, wherein the concave portion is substantially spherical in shape on a plane view.

9. The stick switch claimed in claim 7, wherein the pointing stick is tiltable in four directions which are azimuthally spaced apart from one another by 90 degrees, the plurality of grooves including at least two grooves formed on the concave portion along hypothetical crossing lines indicating the four directions.

10. The stick claimed in claim 9, wherein the two grooves are formed on the concave portion along the four directions, respectively.

11. The stick switch claimed in claim 9, wherein the outer perimeter of the concave portion is circular in shape.

12. A portable electronic device comprising at least one stick switch comprising a pointing stick which projects from a switch box of the stick switch and which is tiltable in different directions in order to carry out switch operations the pointing stick having a top surface including a concave portion for receiving the fingertip of a user, the concave portion having an outer perimeter and a plurality of grooves formed in the outer perimeter at locations corresponding to respective ones of the directions so that the pointing stick may be tilted in the different directions without removing the user's finger tip from the concave portion.

13. The portable electronic device claimed in claim 12, wherein the concave portion is substantially spherical in shape on a plane view.

14. The portable electronic device claimed in claim 12, wherein the pointing stick is tiltable in four directions which are azimuthally spaced apart from one another by 90 degrees, the plurality of grooves including at least two grooves extending onto the concave portion along hypothetical crossing lines indicating the four directions.

15. The portable electronic device claimed in claim 14, wherein the two grooves are formed on the concave portion along the four directions, respectively.

16. The portable electronic device claimed in claim 14, wherein the outer perimeter of the concave portion is circular in shape.

17. A portable telephone comprising at least one stick switch comprising a pointing stick which is projected from a switch box of the stick switch and which is tiltable in different directions in order to carry out switch operations as a function thereof, the pointing stick having a top surface which includes a concave portion for receiving the fingertip of a user, the concave portion having an outer perimeter and a plurality of grooves formed in the outer perimeter at locations corresponding to respective ones of the directions so that the pointing stick may be tilted in the different directions without removing the user's finger tip from the concave portion.

18. The portable telephone claimed in claim 17, wherein the concave portion is substantially spherical in shape on a plane view.

19. The portable telephone claimed in claim 17, wherein the pointing stick is tiltable in four directions which are azimuthally spaced apart from one another by 90 degrees, the plurality of grooves including at least one groove formed on the concave portion along hypothetical crossing lines indicating the four directions.

20. The portable telephone claimed in claim 19, wherein the two grooves are formed on the concave portion along the four directions, respectively.

21. The portable telephone claimed in claim 19, wherein the outer perimeter of the concave portion is circular in shape.

\* \* \* \* \*